(12) United States Patent
Lukka (10) Patent No.: US 9,230,329 B2
(45) Date of Patent: Jan. 5, 2016

(54) METHOD, COMPUTER PROGRAM AND APPARATUS FOR DETERMINING A GRIPPING LOCATION

(75) Inventor: Tuomas Lukka, Helsinki (FI)

(73) Assignee: ZENROBOTICS OY, Helsinki (FI)

( * ) Notice: Subject to any disclaimer, the term of this patent is extended or adjusted under 35 U.S.C. 154(b) by 21 days.

(21) Appl. No.: 13/977,920

(22) PCT Filed: Dec. 30, 2011

(86) PCT No.: PCT/FI2011/051172
§ 371 (c)(1),
(2), (4) Date: Sep. 5, 2013

(87) PCT Pub. No.: WO2012/089928
PCT Pub. Date: Jul. 5, 2012

(65) Prior Publication Data
US 2013/0338826 A1    Dec. 19, 2013

(30) Foreign Application Priority Data

Dec. 30, 2010  (FI) .......................................  20106387

(51) Int. Cl.
*G06F 19/00* (2011.01)
*G06T 7/00* (2006.01)

(52) U.S. Cl.
CPC ....... *G06T 7/004* (2013.01); *G06T 2207/20076* (2013.01); *G06T 2207/30164* (2013.01)

(58) Field of Classification Search
CPC ............ G06T 2207/20076; G06T 2207/30164
USPC ....................................................... 700/245
See application file for complete search history.

(56) References Cited

U.S. PATENT DOCUMENTS

| 4,616,121 | A | * | 10/1986 | Clocksin | .............. | B23K 9/0956 |
| | | | | | | 219/124.34 |
| 6,304,050 | B1 | * | 10/2001 | Skaar | ..................... | B25J 9/1692 |
| | | | | | | 318/568.11 |
| 2007/0147678 | A1 | * | 6/2007 | Gotting | ................ | G06K 9/4628 |
| | | | | | | 382/160 |
| 2007/0299559 | A1 | * | 12/2007 | Janssen | .............. | G06K 9/00201 |
| | | | | | | 700/259 |
| 2008/0150965 | A1 | * | 6/2008 | Bischoff | ................ | G02B 27/01 |
| | | | | | | 345/632 |
| 2008/0240511 | A1 | * | 10/2008 | Ban | ........................ | B25J 9/1697 |
| | | | | | | 382/108 |

FOREIGN PATENT DOCUMENTS

| JP | 05228780 A | 9/1993 |
| JP | 2003223642 A | 8/2003 |
| JP | 2005117791 A | 4/2005 |
| JP | 2010089238 A | 4/2010 |

OTHER PUBLICATIONS

Fujimoto Hideo et al., Image-Based Visual Servoing for Grasping Unknown Objects, Article, p. 876-881.
Boudaba Madjid et al., Grasping of Planar Objects using Visual Perception, Article, p. 605-611.

(Continued)

*Primary Examiner* — Ian Jen
(74) *Attorney, Agent, or Firm* — Hauptman Ham, LLP (57) ABSTRACT

According to one aspect of the invention, there is provided a method comprising: obtaining at least one image comprising at least one object; analyzing the at least one image to determine at least one gripping location to grip an object; selecting a gripping location from the at least one gripping location based on a predetermined criterion; and issuing at least one instruction to a gripper to grip the object at the selected gripping location.

14 Claims, 4 Drawing Sheets

(56) References Cited

OTHER PUBLICATIONS

Jang Han-Young et al., "Visibility-based spatial reasoning for object manipulation in cluttered environments", Apr. 2008, pp. 422-438, vol. 40, Issue 4.
Kristensen Steen et al., "Bin-picking with a solid state range camera", Jun. 30, 2001, pp. 143-151, vol. 35, Issues 3-4.
Morales Antonio et al., Vision-based three-finger grasp synthesis constrained by hand geometry, Article, Jun. 30, 2006, p. 496-512, vol. 54, Issue 6.
Wong Chee Kit et al., Vision Strategies for Robotic Manipulation of Natural Objects, Article, Dec. 2-4, 2009, p. 8, New Zealand.
Yanagihara Yoshimasa et al., Parts-picking in Disordered Environment, Article, Nov. 3-5, 1991, p. 517-522, Japan.
International Search Report mailed May 8, 2012 for PCT/FI2011/051172.
Finland Search Report for 20106387.
Japanese Office Action dated Sep. 1, 2015 in connection with the counterpart Japanese Patent Application No. 2013-546749.

* cited by examiner

METHOD, COMPUTER PROGRAM AND APPARATUS FOR DETERMINING A GRIPPING LOCATION

The present invention relates to solution for manipulating physical objects with a robot arm and a gripper. In particular, the present invention relates to a method determining a gripping location to grip an object.

DESCRIPTION OF THE RELATED ART

Robot systems have widely been used in many industries to perform repetitive tasks that require little capability to actually model visually or cognitively physical objects being manipulated or that require little skill to take a hold on and to move. Robots can also be built to work in environments hostile to human floor workers or to be able to work with material hazardous to humans such as toxic or radioactive materials, waste or massive objects. It is desirable to make such robot systems as autonomous as possible to minimize the amount of human involvement needed.

When the aim is to have the robot arm to manipulate objects, the robot arm is commonly equipped with a device suitable for gripping the objects of interest. Such a device can, for example, resemble a hand, a claw or a clamp. While programming the robot to perform repetitive tasks is relatively easy, there are difficult problems in automatically manipulating objects, especially related to recognizing the objects from a varying environment or an environment crowded with other objects, and manipulating an object which resides among other objects.

Robotic systems used for manipulating objects typically require the shape of the objects to be known beforehand, so that a gripper of a robot arm can be designed to reliably grip the objects. When gripping objects of varying location, orientation and geometry from an unstructured environment, such as when sorting waste, the gripper cannot be designed for a specific object beforehand and a more generic gripper design must be used.

One of the drawbacks of the prior art is that it is difficult to design a gripper which can reliably grip objects of varying shapes and sizes from amongst other undesirable objects or other obstructions.

SUMMARY OF THE INVENTION

According to one aspect of the invention, there is provided a method comprising: obtaining at least one image comprising at least one object, analysing the at least one image to determine at least one gripping location to grip an object, selecting a gripping location from the at least one gripping location based on a predetermined criterion, and issuing at least one instruction to a gripper to grip the object at the selected gripping location.

According to another aspect of the invention, there is provided a computer program comprising program code comprising instructions to perform the method.

According to another aspect of the invention, there is provided an apparatus comprising means for obtaining at least one image comprising an object, means for analysing the at least one image to determine at least one gripping location to grip the object, means for selecting a gripping location from the at least one gripping location based on a predetermined criterion, and means for issuing at least one instruction to a gripper to grip the object at the selected gripping location.

In one embodiment of the invention, the analysing and selecting steps further comprise: calculating a background mask, the background mask being a mask of image pixels which are not part of any object in the image, calculating an object mask, the object mask being a mask of image pixels which are part of the object to be gripped, calculating a gripper mask, the gripper mask being a mask of image pixels corresponding to gripping parts of the gripper, calculating a gripping area mask, the gripping area mask being a mask of image pixels that fit inside the gripper, overlaying the gripper mask on the background mask in at least one location, calculating the overlap of the gripper mask and the background mask at the at least one location, overlaying the gripping area mask on the object mask in at least one location, calculating the overlap of the gripping area mask and the object mask at the at least one location; and selecting a gripping location based on the overlapping calculations.

In one embodiment of the invention, the method further comprises assigning each pixel in the at least one image a value corresponding to the likelihood that the pixel belongs to the object.

In one embodiment of the invention, the method further comprises assigning a first quality factor for the overlap of the gripper mask and the background mask at the at least one location based on the calculating the overlap of the gripper mask and the background mask at the at least one location, assigning a second quality factor for the overlap of the gripping area mask and the object mask based on the calculating the overlap of the gripping area mask and the object mask at the at least one location, and selecting the gripping location based on the first and second quality factors.

In one embodiment of the invention, selecting the gripping location based on the first and second quality factors further comprises selecting a gripping location where the product of the first and second quality factors is the highest.

In one embodiment of the invention, selecting the gripping location based on the first and second quality factors further comprises setting a minimum value for the first quality factor of the gripping location to be selected.

In one embodiment of the invention, the method further comprises calculating multiple gripper masks and gripping area masks which correspond to different positions of the gripper.

In one embodiment of the invention, the gripping mask and the gripping area mask are precalculated for a set of possible gripper positions.

In one embodiment of the invention, the gripping mask and the gripping area mask are calculated for a set of possible gripper positions in real-time.

In one embodiment of the invention, calculating the overlap of masks further comprises: dividing the gripper mask into gripper mask parts; calculating the overlap of a gripper mask part and the background mask; calculating the overlap for each of the other gripper mask parts by shifting the values calculated with the first gripper mask part by an offset of each other gripper mask part relative to the first gripper mask part in the gripper mask; and calculating the overlap of the whole gripper mask and the background mask as a sum of the overlaps calculated for the gripper mask parts.

In one embodiment of the invention, calculating the overlap of masks further comprises: dividing the gripping area mask into gripping area mask parts; calculating the overlap of a gripping area mask part and the object mask; calculating the overlap for each of the other gripping area mask parts by shifting the values calculated with the first gripping area mask part by an offset of each other gripping area mask part relative to the first gripping area mask part in the gripping area mask;

and calculating the overlap of the whole gripping area mask and the object mask as a sum of the overlaps calculated for the gripping area mask parts.

In one embodiment of the invention, convolution with Fast Fourier Transform (FFT) is used in calculating the overlaps.

In one embodiment of the invention, implementing some or all of the steps by using Field Programmable Gate Arrays (FPGA).

In one embodiment of the invention, the apparatus comprises means for implementing various embodiments of the invention.

In one embodiment of the invention, the apparatus comprises means for calculating a background mask, the background mask being a mask of image pixels which are not part of any object in the image; calculating an object mask, the object mask being a mask of image pixels which are part of the object to be gripped; calculating a gripper mask, the gripper mask being a mask of image pixels corresponding to gripping parts of the gripper; calculating a gripping area mask, the gripping area mask being a mask of image pixels that fit inside the gripper; overlaying the gripper mask on the background mask in at least one location; calculating the overlap of the gripper mask and the background mask at the at least one location; overlaying the gripping area mask on the object mask in at least one location; calculating the overlap of the gripping area mask and the object mask at the at least one location; and wherein the means for selecting are configured to select a gripping location based on the overlapping calculations.

In one embodiment of the invention, the apparatus comprises means for assigning each pixel in the at least one image a value corresponding to the likelihood that the pixel belongs to the object.

In one embodiment of the invention, the apparatus comprises means for assigning a first quality factor for the overlap of the gripper mask and the background mask at the at least one location based on calculating the overlap of the gripper mask and the background mask at the at least one location, and for assigning a second quality factor for the overlap of the gripping area mask and the object mask based on calculating the overlap of the gripping area mask and the object mask at the at least one location; wherein the means for selecting are configured to select the gripping location based on the first and second quality factors.

In one embodiment of the invention, the means for selecting are configured to select a gripping location where the product of the first and second quality factors is the highest.

In one embodiment of the invention, the means for selecting are configured to set a minimum value for the first quality factor of the gripping location to be selected.

In one embodiment of the invention, the means for calculating are configured to calculate multiple gripper masks and gripping area masks which correspond to different positions of the gripper.

In one embodiment of the invention, the means for calculating are configured to divide the gripper mask into gripper mask parts; calculate the overlap of a gripper mask part and the background mask; calculate the overlap for each of the other gripper mask parts by shifting the values calculated with the first gripper mask part by an offset of each other gripper mask part relative to the first gripper mask part in the gripper mask; and calculate the overlap of the whole gripper mask and the background mask as a sum of the overlaps calculated for the gripper mask parts.

In one embodiment of the invention, the means for calculating are configured to divide the gripping area mask into gripping area mask parts; calculate the overlap of a gripping area mask part and the object mask; calculate the overlap for each of the other gripping area mask parts by shifting the values calculated with the first gripping area mask part by an offset of each other gripping area mask part relative to the first gripping area mask part in the gripping area mask; and calculate the overlap of the whole gripping area mask and the object mask as a sum of the overlaps calculated for the gripping area mask parts.

The present invention discloses a solution where "handles" in objects are recognized using machine vision. A "handle" is a part of the object where it can be gripped with an installed gripper. Advantages of at least one embodiment of the invention include that an object larger than the opening of the gripper can still be gripped if it has a smaller protruding part which can act as a handle for the gripper to grip. Furthermore, at least one embodiment of the invention provides a solution where it is possible to determine an optimal gripping location to grip an object.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
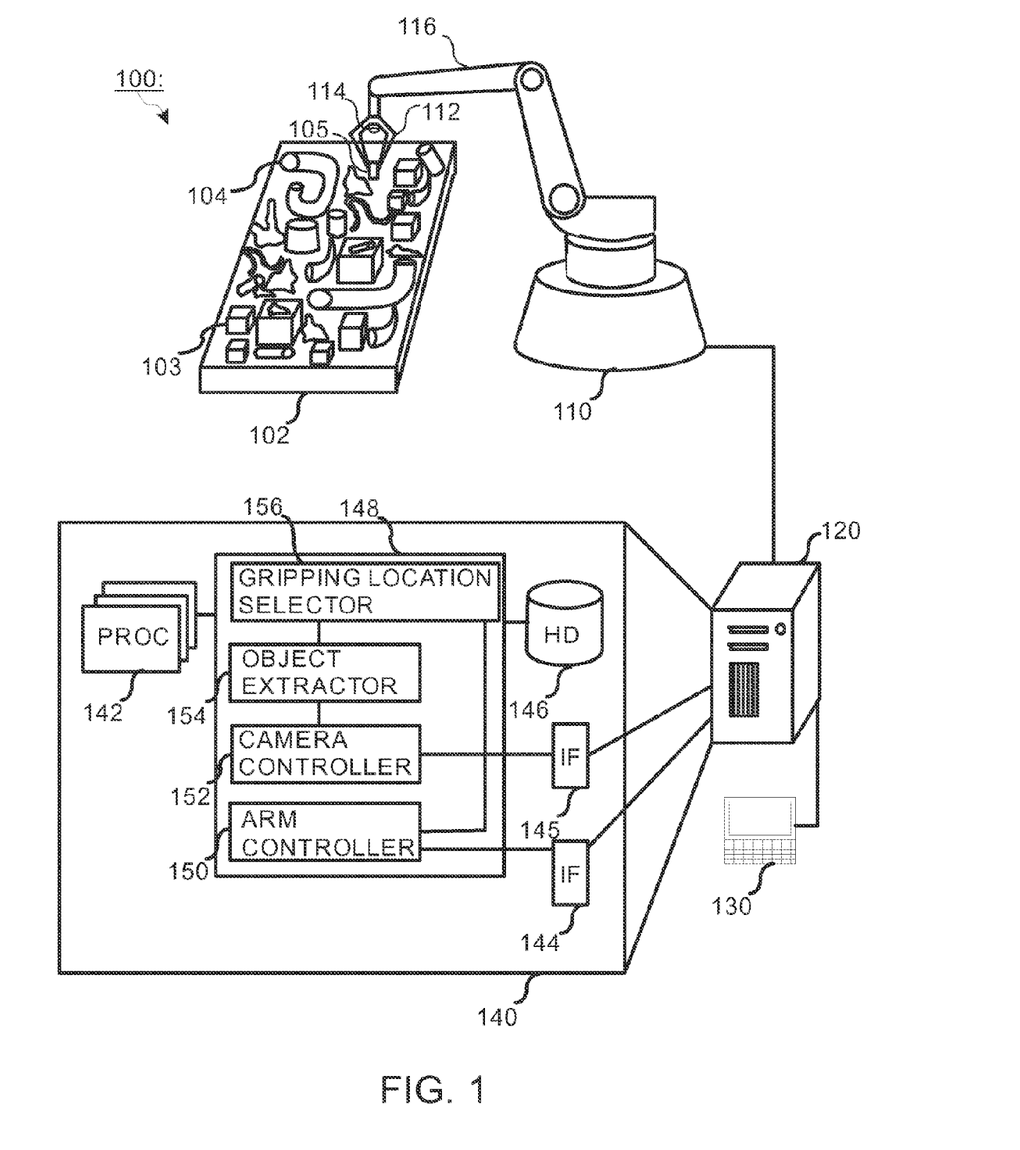
FIG. 1 illustrates a robot system according to one embodiment of the invention.

FIG. 1 illustrates a robot system performing object gripping according to one embodiment of the invention. A robot system 100 comprises a robot 110, for example, an industrial robot comprising a robot arm 116. To the robot arm 116 is connected a gripper 112, which may also be a clamp or a claw. The robot arm 116 is capable of moving the gripper 112 within an operating area 102. The robot arm 116 may comprise a number of motors, for example, servo motors that enable the robot arms rotation, elevation and gripping to be controlled. Various movements of the robot arm 116 and the gripper 112 are effected e.g. by actuators. By way of example, the actuators can be electric, pneumatic or hydraulic, or any combination of these. The actuators may move or rotate various elements of the robot 110. A set of electrical drivers may be used to convert data processing signals, in other words, instructions from an apparatus 120 to appropriate voltage and power levels for controlling the actuators of the robot arm 116. In response to control signals from the apparatus 120, the actuators perform various mechanical functions including but not necessarily limited to: positioning the gripper 112 over a specific location within the operating area 102, lowering or raising the gripper 112, and closing and opening of the gripper 112.

The robot 110 may comprise various sensors. By way of example, the sensors may comprise various position sensors (not shown) which indicate the position of the robot arm 116 and the gripper 112, as well as the open/close status of the gripper 112. The open/close status of the gripper 112 is not restricted to a simple yes/no bit. In one embodiment of the invention, the gripper 112 may indicate a multi-bit open/close status in respect of each of its fingers, whereby an indication of the size and/or shape of the object(s) in the gripper may be obtained.

In addition to the position sensors, the set of sensors may comprise strain sensors, also known as strain gauges or force feedback sensors, which indicate strain experienced by various elements of the robot arm 116 and the gripper 112. In an illustrative but non-restrictive implementation example, the strain sensors comprise variable resistances whose resistance varies depending on the tension of compression applied to them. Because the changes in resistance are small compared to the absolute value of the resistance, the variable resistances are typically measured e.g. in a Wheatstone bridge configuration.

In one embodiment, to the gripper 112 or to the robot arm 116 there is connected a camera 114, which is directed to have in its visual field objects gripped by the gripper 112, at least partly. In FIG. 1 the camera is illustrated to be inside the gripper 112. The camera 114 may also be located on a separate shaft connected to the robot arm 116 and positioned so that objects gripped by gripper 112 are well in the visual field of camera 114. In another embodiment, the camera 114 may also be located in a remote position Independent of the gripper 112 or the robot arm 116. In one embodiment, the robot 110 sorts objects contained in an arena 102, that is, in its operating arena. The arena 102 comprises a number of objects such as objects 103, 104 and 105. In FIG. 1 it is shown that robot 110 has performed a gripping operation on a target object 105 and holds it in the gripper 112.

The robot 110 is connected to a data processing apparatus 120, in short an apparatus. The internal functions of the apparatus 120 are illustrated with a box 140. The apparatus 120 comprises at least one processor 142, a Random Access Memory (RAM) 148 and a hard disk 146. The processor 142 controls the robot arm by executing software entities 150, 152, 154 and 156. The apparatus 120 comprises also at least a camera peripheral interface 145 and a robot interface 144 to control the robot 110. The peripheral interface 145 may be a bus, for example, a Universal Serial Bus (USB). The apparatus 120 may also be connected to a terminal 130, which comprises at least a display and a keyboard. The terminal 130 may be a laptop connected using a local area network to the apparatus 120. In another embodiment, the apparatus 120 and the terminal 130 are implemented with a single computer.

In order to communicate with external devices, such as the robot 110, the apparatus 120 comprises or utilizes external reception/transmission circuitry such as a robot interface 144, which comprises a transmission circuitry, reception circuitry and it may comprise an internal or external antenna (not shown). The apparatus 120 may utilize several different interfacing technologies for communicating with the physical world, which in the present example comprises the robot 110, the gripper 112 and the camera 114. Wireless local-area networks (WLAN) and short-range wireless interfaces, such as infrared, radio or Bluetooth, are illustrative but non-restrictive examples of such wireless reception/transmission circuitry. Instead of such wireless communication technologies or in addition to them, the data processing apparatus may utilize wired connections, such as a USB, any parallel or serial interface, or other types of industry-standard interfaces or proprietary interfaces.

In addition, the memory 140 of the apparatus 120 may contain a collection of programs or, generally, software entities that are executed by the at least one processor 142. There is an arm controller entity 150 which issues instructions via the robot interface 144 to the robot 110 in order to control the rotation, elevation and gripping of the robot arm 116 and the gripper 112. The arm controller entity 150 may also receive sensor data pertaining to the measured rotation, elevation and gripping of the robot arm 116 and the gripper 112. The arm controller entity 150 may actuate the arm with new instructions issued based on feedback received to the apparatus 120 via the interface 144. The arm controller entity 150 is configured to issue instructions to the robot 110 to perform well-defined high-level operations. An example of a high-level operation is moving the robot arm to a specified position. The arm controller entity 150 may also utilize various software drivers, routines or dynamic link libraries to convert the high-level operation to a series of low-level operations, such as outputting an appropriate sequence of output signals via the electrical drivers to actuators of the robot 110.

A camera controller entity 152 communicates with the camera 114 using an interface 145. The camera controller entity 152 may cause the camera 114 to take a number of pictures at predefined time intervals starting at a moment in time instructed by camera controller entity 152. Generally, the camera controller entity 152 may issue an instruction to the camera 114 to take a picture at any moment in time. The camera controller entity 152 obtains the pictures taken by the camera 114 via the interface 145 and stores the pictures in the memory 140. In another embodiment, the camera 114 is configured to record video stream and the video stream is processed by the apparatus 120 to extract still images.

The object extractor entity 154 is configured to extract a target object to be gripped from a predefined number of source pictures.

The gripping location selector 156, which may perform further analysis on the target object based on various visual characteristics of the target object such as a shape, size, a color or a texture, determines a selected gripping location from a set of possible gripping locations based on a predetermined criterion. The selection functionality is discussed in more detail shortly.

In an illustrative but non-restrictive example, the arena 102 is a conveyor belt, or a portion of a conveyor belt that intersects the robot's 110 operating area. In one embodiment, the apparatus 120 has little or no a priori information on the objects 103, 104 and 105 within the arena 102, such as the size, shape and/or color of the objects of interest. In some embodiments of the invention, the apparatus 120 may have some a priori information on the objects of interest, or it may have gained information on the objects by learning, but at least the background (other objects), the position and orientation of the objects of interest are typically unknown a priori. That is, objects 103, 104 and 105 may be in random positions and orientations in the arena 102, and the objects may overlap each other.

When the at least one processor 142 executes functional entities associated with the invention, a memory 148 comprises entities such as the arm controller entity 150, the camera controller entity 152, the object extractor entity 154 and the gripping location selector entity 156. The functional entities within the apparatus 120 illustrated in FIG. 1 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optic disk. Some functional entities may be implemented as program modules linked to another functional entity. The functional entities in FIG. 1 may also be stored in separate memories and executed by separate processors, which communicate, for example, via a message bus or an internal network within the network node. An example of such a message bus is the Peripheral Component Interconnect (PCI) bus.

In one embodiment of the invention, the software entities 150-156 may be implemented as separate software entities such as, for example, subroutines, processes, threads, methods, objects, modules and program code sequences. They may also be just logical functionalities within the software in the apparatus 120, which have not been grouped to any specific separate subroutines, processes, threads, methods, objects, modules and program code sequences. Their functions may be spread throughout the software of the apparatus 120. Some functions may be performed in the operating system of the apparatus 120.

The embodiments of the invention described herein regarding FIG. 1 may be used in any combination with each other. Several of the embodiments may be combined together to form a further embodiment of the invention.

Figure 2:
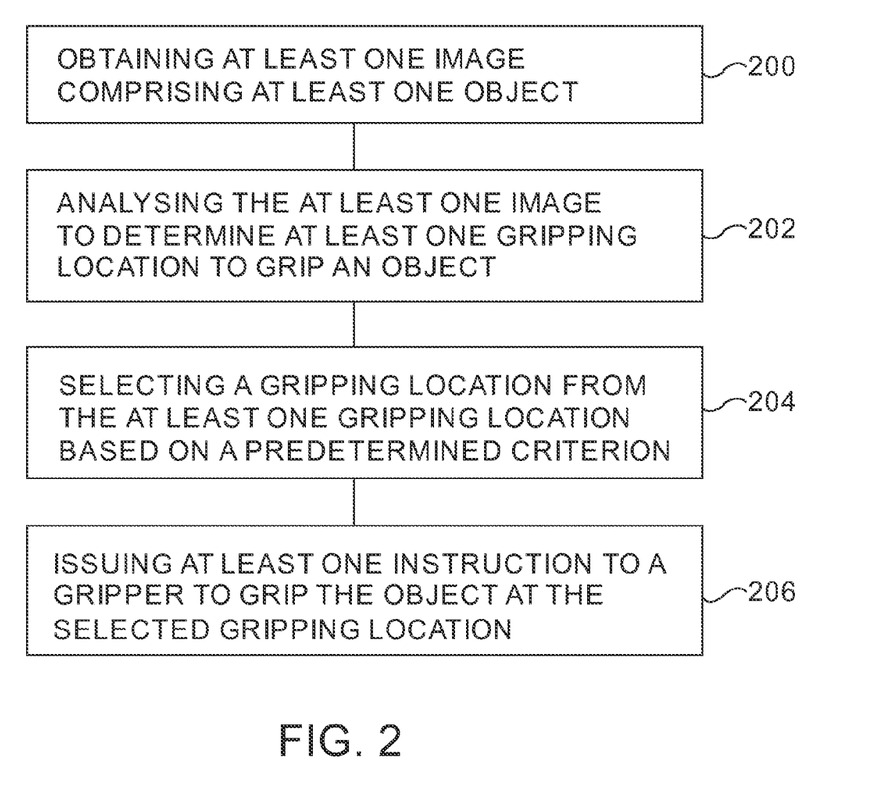
FIG. 2 discloses a block diagram illustrating a method according to one embodiment of the invention.

FIG. 2 discloses a block diagram illustrating a method according to one embodiment of the invention.

At step 200, at least one image comprising at least one object is obtained. The at least one image may comprise one or multiple objects. The objects may also overlap with each other. Thus, in some cases, an object may in fact be inseparable from another object. The at least one image is analysed to determine at least one gripping location to grip an object, step 202. Based on the analysis a gripping location is selected from the at least one gripping location based on a predetermined criterion, step 204. At step 206, at least one instruction is issued to a gripper to grip the object at the selected gripping location.

Figure 3:
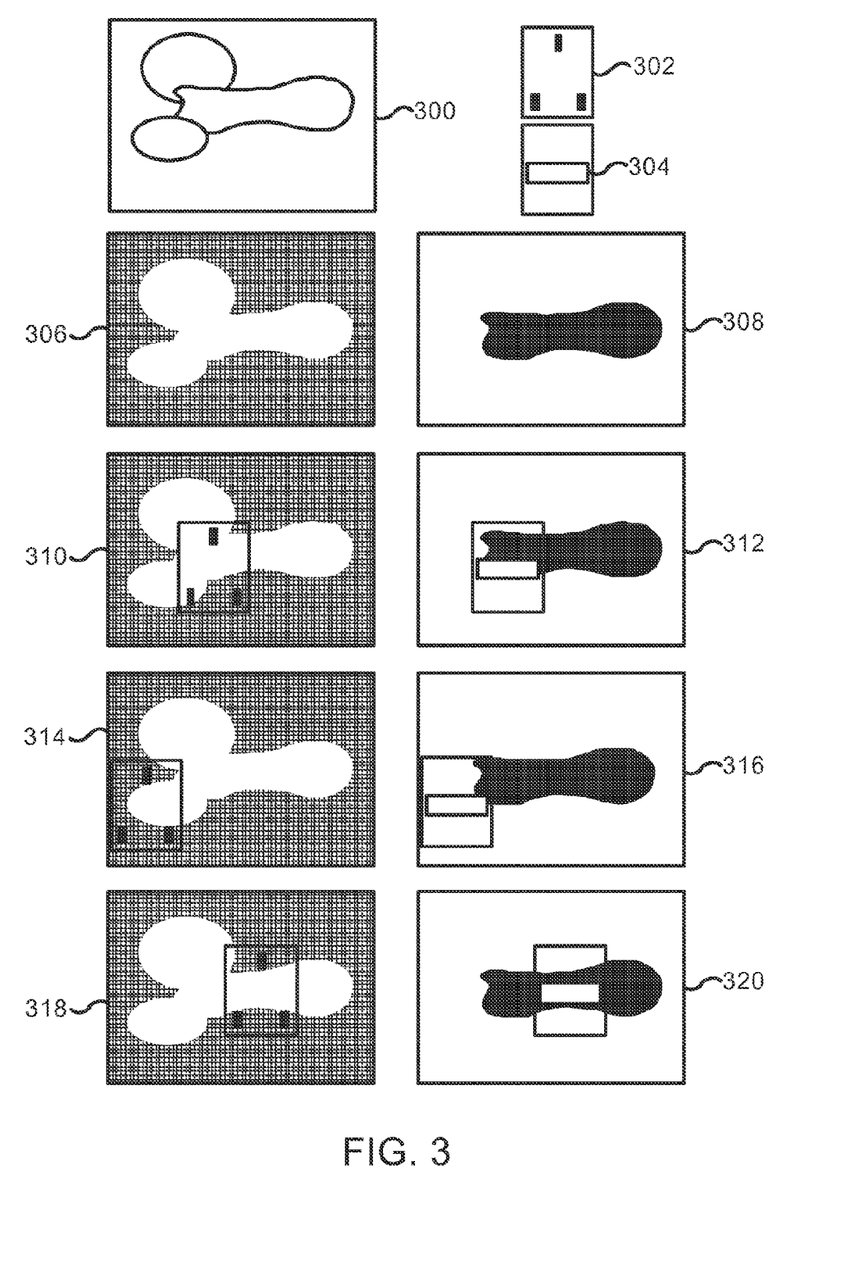
FIG. 3 discloses a solution for analysing at least one image to determine at least one gripping location to grip an object and for selecting a gripping location from the at least one gripping location based on a predetermined criterion according to one embodiment of the invention.

FIG. 3 discloses an embodiment for analysing the at least one image to determine at least one gripping location to grip the object and for selecting a gripping location from the at least one gripping location based on a predetermined criterion. The analysing and selecting functions are performed e.g. with the object extractor 154 and/or the gripping location selector 156 disclosed in FIG. 1.

As disclosed in FIG. 1, one or more cameras are used to acquire at least one image of a working area (300). The working may be stationary or alternatively e.g. a moving conveyor belt. The image may originally be a still image taken by a camera or a still image extracted from a video steam. In one embodiment, the image is a two-dimensional image. In another embodiment, the image is a three-dimensional image. In one embodiment, the three-dimensional image has been divided into one or more two-dimensional subparts which are then processed further.

The image is processed to recognize an area in the image which corresponds to an object to be gripped. In one embodiment, each pixel in the original image is assigned a value which corresponds to the likelihood that the pixel belongs to the object or not. For some pixels it may be uncertain whether these pixels are part of the object or not, e.g. fuzzy pixels at boundaries of the object. Therefore, in one embodiment, two mask images are calculated. The first mask image is a background mask (306) and the second mask image is an object mask (308).

The background mask (306) is a mask of pixels in the original image which are not part of any objects or obstructions (the grid part in FIG. 3). In other words, the mask of pixels represents part of empty space where the gripper of FIG. 1 is able to operate. The object mask (308) is a mask of pixels in the original image which are part of the object to be gripped (the black object area in FIG. 3).

In order to find a location for gripping, in one embodiment, another pair of masks is generated: a gripper mask (302) and a gripping area mask (304). The gripper mask (302) is a mask of pixels corresponding to the parts of the gripper. The gripper mask (302) is represented in this embodiment as three separate "fingertips" of a three-finger gripper arranged in a triangular form. In other embodiments, the gripper mask (302) may also take other forms. The empty space between the topmost fingertip and the lowermost fingertips depicts the maximum gripping distance between the fingertips. The gripping area mask (304) is a mask of pixels that fit inside the gripper. The smaller rectangle in the gripping area mask (304) corresponds to space inside the gripper, which the object preferably fills partly or in whole when the object is gripped. In one embodiment, the smaller rectangle in the gripping area mask (304) represents a minimum area/volume within the gripper which a gripped part of the object must fulfill. In another embodiment, there may be several separate gripping area masks that are used when determining a gripping location. At least some of these may be, as above, represent a minimum area/volume within the gripper which a gripped part of the object must fulfill. Furthermore, in one embodiment, several separate gripper masks may simultaneously be used to determine a gripping location. In one embodiment, a gripping location to be selected does not necessarily have to fill the entire gripping area mask (the smaller rectangle) (304).

In order to calculate a gripping location of the object, at first the gripper mask (302) is overlayed on the background mask (306) at different locations and the overlap of the two masks is calculated at each location separately. Locations where the gripper mask (302) and the background mask (306) do not completely overlap correspond to gripping positions where the gripper would collide with something. Therefore, these locations may not be regarded as possible locations to grip the object and, in one embodiment, these gripping positions are rejected.

References 310 and 312 represent an example of a situation where the areas ("fingertips") in the gripper mask (302) do not all completely overlap with the background mask (306) and the gripping area mask (304) overlaps with the object mask (308) moderately well. Therefore, as above, this location is not regarded as a possible location to grip the object and thus also this gripping position is rejected.

References 314 and 316 represent an example of a situation where the areas ("fingertips") in the gripper mask (302) completely overlap with the background mask (306), but the gripping area mask (304) overlaps with the object mask (308) only by a small portion. Therefore in one embodiment, as above, this location is not regarded as a possible location to grip the object and thus also this gripping position is rejected.

References 318 and 320 represent an example of a situation where the areas ("fingertips") in the gripper mask (302) completely overlap with the background mask (306) and also the gripping area mask (304) completely overlaps with the object mask (308). This example thus represents one possible gripping location.

As a summary, the gripper mask (302) is overlaid on the background mask (306) at different locations and the overlap of the masks is calculated. Locations where the amount of overlap is high are locations where gripping would in principle be possible. Similarly, the gripping area mask (304) is overlaid on the object mask (308) at different locations and the overlap of the masks is calculated. Locations where the amount of overlap between both the gripper mask (302) and the background mask (306) and between the gripping area mask (304) and the object mask (308) is high, are locations where the gripper encloses a big part of the object and a successful gripping is likely.

Thus, a good candidate for a gripping location is where the gripper has enough space to operate around object and the object's size at the gripping location is appropriate for the gripper. For determining the best orientation for gripping, separate gripper masks (302) and gripping area masks (304) which correspond to different positions of the gripper can be used to repeat the procedure described above for each pair, and then selecting the gripping location and position which gives the highest value of overlap. These masks can be pre-calculated for a set of possible gripper positions, or they can be calculated on the fly.

In one embodiment, both of the above overlaps are given a numerical quality factor. The location where the product of the quality factors is the highest is selected as the best gripping location of the object. In one embodiment, a minimum value is determined for at least one of the quality values. This ensures, in practice, that the gripper has enough space to move to the selected gripping location.

One possible method for calculating the overlaps is the convolution of the masks. The convolution can be calculated efficiently by using a Fast Fourier Transform (FFT) algorithm. In one embodiment, a discrete Fourier transform is calculated of the masks. After that the calculation of the overlap is performed by element-wise multiplication of the transformed masks. After calculating the multiplication an inverse FFT is taken from the result, resulting in the convolution result of the original masks.

Some or all of the calculations in the described method can be done in parallel and are hence well suited for implementation using Field Programmable Gate Arrays (FPGA). FPGAs are widely used for tasks such as FFT and convolution, and either those parts of the described method or the method as a whole can be efficiently implemented with them.

Figure 5A:
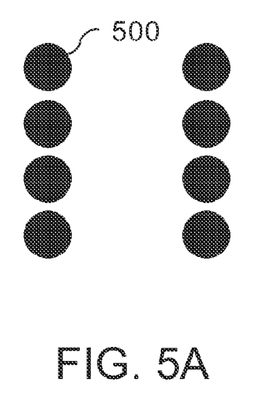
FIG. 5A discloses a mask divided into parts according to one embodiment of the invention.

In another embodiment, the gripper mask is divided into small identical parts. FIG. 5A discloses that the gripper mask in divided into parts. One should observe that, in this embodiment, all the parts of the mask can be seen as copies of one part (500) shifted with some offset dx, dy. The calculations are then performed using the part (500) as a mask, as disclosed in FIG. 5B, by calculating the overlap between the underlying mask and the part at different locations. As the part of the mask is smaller than the whole mask, the amount of operations is smaller than it would be for the whole mask and the calculation is respectively faster. The end result is an array of values which correspond to the calculated overlap of the part and the underlying mask, at different locations relative to the underlying mask.

Figure 5B:
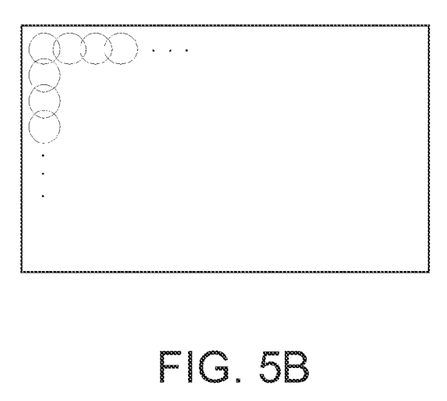
FIG. 5B illustrates calculating convolution of the mask part of FIG. 5A according to one embodiment of the invention.

These values calculated with the first part can then be reused as the values for the other parts. The calculation for the whole mask can be accumulated from the values when they are before summation shifted by an amount corresponding to the difference in mask part locations. In other words, convolution with the whole mask would then be the sum of the convolutions with the mask parts. However, the other convolutions would be the same array as the first one, only shifted by the difference dx, dy from the first part. Therefore, the convolution for the whole mask in each image point is the array value at the point+the array value at (point+offset for the second part)+the array value at (point+offset for the third part) etc. for all parts of the divided mask.

The above procedure is even more efficient than using FFT to calculate the convolution, because calculating an FFT and an inverse FFT is a costly operation compared to accumulating the mask (one summation for each pixel in the mask part). A further advantage is that in calculating the overlap it is possible to use also other mathematical operations than multiplication, e.g. taking a minimum value of the pixel values in the two masks, or other functions which cannot be done in an efficient manner by using the FFT.

Figure 4A:
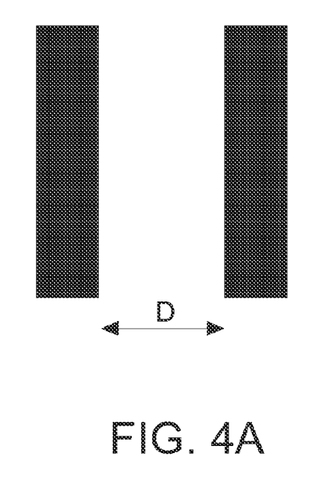
FIG. 4A discloses an example of a possible gripper mask.
Figure 4B:
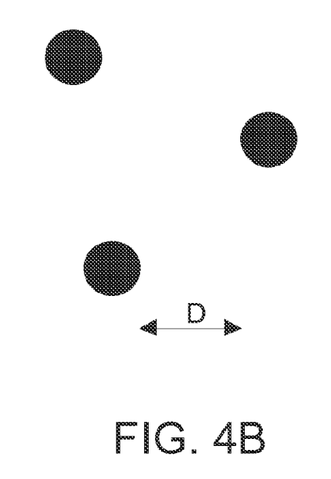
FIG. 4B discloses another example of a possible gripper mask.

FIGS. 4A and 4B disclose two examples of possible gripper masks. In both examples, the distance D indicated by an arrow may vary according to the opening of the gripper.

The embodiments of the invention described herein may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
obtaining at least one image comprising at least one object;
calculating a background mask, the background mask being a mask of image pixels which are not part of any object in the image;
calculating an object mask, the object mask being a mask of image pixels which are part of the object to be gripped;
calculating a gripper mask, the gripper mask being a mask of image pixels corresponding to gripping parts of a gripper;
calculating a gripping area mask, the gripping area mask being a mask of image pixels that fit inside the gripper;
overlaying the gripper mask on the background mask in at least one location;
calculating an overlap area of the gripper mask and the background mask at the at least one location;
overlaying the gripping area mask on the object mask in at least one location;
calculating an overlap area of the gripping area mask and the object mask at the at least one location;
selecting a gripping location based on the calculated overlap area; and
issuing at least one instruction to the gripper to grip the object at the selected gripping location.

2. The method of claim 1, wherein the method further comprises:
assigning to each pixel in the at least one image a value corresponding to the likelihood that the pixel belongs to the object.

3. The method of claim 1, further comprising:
assigning a first quality factor to the overlap area of the gripper mask and the background mask based on the calculated overlap area of the gripper mask and the background mask;
assigning a second quality factor to the overlap area of the gripping area mask and the object mask based on the calculated overlap area of the gripping area mask and the object mask; and
selecting the gripping location based on the first and second quality factors.

4. The method of claim 3, wherein said selecting the gripping location based on the first and second quality factors further comprises:
selecting the gripping location where the product of the first and second quality factors is the highest.

5. The method of claim 4, wherein said selecting the gripping location based on the first and second quality factors further comprises:
setting a minimum value for the first quality factor of the gripping location to be selected.

6. The method of claim 1, further comprising:
calculating multiple gripper masks and gripping area masks which correspond to different positions of the gripper.

7. The method of claim 1, wherein the gripping mask and the gripping area mask are precalculated for a set of possible positions of the gripper.

8. The method of claim 1, wherein the gripping mask and the gripping area mask are calculated for a set of possible positions of the gripper in real-time.

9. The method of claim 1, wherein said calculating the overlap area of the gripper mask and the background mask further comprises:
dividing the gripper mask into gripper mask parts;
calculating an overlap area of a gripper mask part and the background mask;
calculating an overlap area for each of the other gripper mask parts by shifting the value calculated with the first gripper mask part by an offset of each other gripper mask part relative to the first gripper mask part in the gripper mask; and
calculating the overlap area of the whole gripper mask and the background mask as a sum of the overlaps calculated for the gripper mask parts.

10. The method of claim 1, wherein calculating the overlap area of the gripping area mask and the object mask further comprises:
dividing the gripping area mask into gripping area mask parts;
calculating an overlap area of a gripping area mask part and the object mask;
calculating an overlap area for each of the other gripping area mask parts by shifting the value calculated with the first gripping area mask part by an offset of each other gripping area mask part relative to the first gripping area mask part in the gripping area mask; and
calculating the overlap area of the whole gripping area mask and the object mask as a sum of the overlaps calculated for the gripping area mask parts.

11. The method of claim 1, wherein convolution with Fast Fourier Transform (FFT) is used in said calculating the overlap areas.

12. The method of claim 1, wherein at least one step of the steps of claim 1 is implemented by a Field Programmable Gate Arrays (FPGA).

13. A non-transitory computer-readable record medium which contains a computer program comprising program code comprising instructions for causing a processor to perform the method of claim 1.

14. An apparatus,. comprising:
- means for obtaining at least one image comprising an object;
- means for calculating a background mask, the background mask being a mask of image pixels which are not part of any object in the image;
- means for calculating an object mask, the object mask being a mask of image pixels which are part of the object to be gripped;
- means for calculating a gripper mask, the gripper mask being a mask of image pixels corresponding to gripping parts of a gripper;
- means for calculating a gripping area mask, the gripping area mask being a mask of image pixels that fit inside the gripper;
- means for overlaying the gripper mask on the background mask in at least one location;
- means for calculating an overlap area of the gripper mask and the background mask at the at least one location;
- means for overlaying the gripping area mask on the object mask in at least one location;
- means for calculating an overlap area of the gripping area mask and the object mask at the at least one location;
- means for selecting a gripping location based on the overlapping calculations; and
- means for issuing at least one instruction to the gripper to grip the object at the selected gripping location.

* * * * *